United States Patent [19]

Baer et al.

[11] 4,075,385

[45] Feb. 21, 1978

[54] ANTI-REFLECTIVE COATING FOR HIGH ENERGY OPTICAL COMPONENTS

[75] Inventors: Adrian D. Baer; Terence M. Donovan, both of China Lake, Calif.

[73] Assignee: The United States of America as represented by the Secretary of the Navy, Washington, D.C.

[21] Appl. No.: 783,883

[22] Filed: Apr. 1, 1977

[51] Int. Cl.² ............... B32B 7/00; B32B 15/04; G02B 5/26
[52] U.S. Cl. ............... 428/215; 156/99; 350/1.1; 350/164; 350/166; 350/319; 428/336; 428/469; 428/539; 428/622
[58] Field of Search ............... 331/94.5 R, 94.5 C, 331/94.5 D, 94.5 F; 156/99, 100; 350/1, 164, 165, 166, 2, 318, 319; 428/212, 432, 539, 332

[56] References Cited

U.S. PATENT DOCUMENTS

| | | | |
|---|---|---|---|
| 2,281,474 | 4/1942 | Cartwright et al. | 350/164 |
| 2,561,077 | 7/1951 | Tilton | 136/4 |
| 2,865,253 | 12/1958 | Thielens | 325/2 |
| 2,887,359 | 5/1959 | Gans | 350/1 |
| 3,569,858 | 3/1971 | Witteman | 350/165 |
| 3,849,244 | 11/1974 | Groth | 350/165 |
| 3,883,214 | 3/1975 | Hoffman | 350/165 |
| 3,934,961 | 1/1976 | Itoh et al. | 350/164 |
| 4,009,453 | 2/1977 | Mahlein | 331/94.5 C |

*Primary Examiner*—George F. Lesmes
*Assistant Examiner*—R. Eugene Varndell, Jr.
*Attorney, Agent, or Firm*—R. S. Sciascia; Roy Miller; Lloyd E. K. Pohl

[57] ABSTRACT

A sodium chloride or potassium chloride laser window is rendered anti-reflective by depositing, in order, an $As_2Se_3$ layer, a NaF layer and an $As_2Se_3$ layer. Near optimum thicknesses to permit transmission of light having wavelengths in the range of from 1 to 12 micrometers are disclosed.

2 Claims, No Drawings

ANTI-REFLECTIVE COATING FOR HIGH ENERGY OPTICAL COMPONENTS

BACKGROUND OF THE INVENTION

1. Field of the Invention

This invention relates to antireflectance coatings for sodium chloride and potassium chloride laser windows.

2. Description of the Prior Art

Laser systems utilize thin-film coatings to create high- and low-reflectance surfaces. The performance of these coatings in a particular laser system limits the power-handling capability of that system. Improvement in performance has been sought by investigating (1) design, (2) methods of deposition and (3) materials.

Insofar as materials are concerned, only a few have been carefully studied. Studies were made on Ge, $MgF_2$, $As_2S_3$, $BaF_2$ and ZnS and reported in 1970. The results of these studies indicated that $As_2S_3$ and $BaF_2$ were the best choices as materials from which to fabricate multilayer antireflectance coatings for use at 10.6 μm wavelengths. More recent studies stressed the use of the $ThF_4$, $BaF_2$, ZnS, ZnSe, $As_2S_3$ and TlI. Very recently, lanthanide fluorides have been studied. Insofar as is known by the inventors, the materials NaF and $As_2Se_3$ were never studied prior to tests leading to the present invention.

SUMMARY OF THE INVENTION

According to this invention, a three layer coating consisting of a first layer of $As_2Se_3$, a second layer of NaF and a third layer of $As_2Se_3$ is deposited on either a NaCl or a KCl laser window to eliminate surface reflections at specific wavelengths between 1 and 12 μm.

DESCRIPTION OF THE PREFERRED EMBODIMENT

The first step in the preparation of a coated window according to this invention is to deposit a layer of $As_2Se_3$ on a NaCl or KCl laser window. This step may be carried out by means of the following substeps:

1. Suspend the window near the top of a standard, oil-pumped vacuum system.
2. Place a quartz crucible containing $As_2Se_3$ approximately 15 inches below the window.
3. Evacuate the system to about $10^{-8}$ torr.
4. Heat the window to a temperature in the range of from about 75° to 100° C. (This may be done by means of an infrared lamp.)
5. Heat the $As_2Se_3$. (This may be done by means of a 15-20 amp tantalum alloy wire passing directly through the $As_2Se_3$.)

As the $As_2Se$ is heated it is vaporized and the pressure within the system rises to about $10^{-5}$ to $10^{-6}$ torr. The vaporized $As_2Se_3$ is allowed to condense on the window at a rate of about 0.5 nm/sec. When a desired thickness is reached, the system is shut off.

The next step is to deposit a layer of NaF on the $As_2Se_3$ layer. This step may be accomplished by carrying out the following substeps:

1. Replace the crucible of $As_2Se_3$ with a molybdenum boat or quartz crucible containing NaF.
2. Evacuate the system to about $10^{-8}$ torr.
3. Heat the substrate to 75° to 100° C.
4. Pass 150 to 175 amps through the molybdenum boat to heat the NaF.

The NaF is deposited at a rate of about 10 nm/sec. The system is shut off when a desired thickness has been deposited.

The third step in preparing a coated window according to this invention is to deposit a layer of $As_2Se_3$ on the NaF layer. To carry out this step, the substeps outlined about with respect to the deposition of $As_2Se_3$ are repeated.

Finally, the first, second and third steps outlined above are repeated, in order, to coat the opposite side of the window, i.e., the side that was up while the first three steps were being carried out to deposit the three layers on the lower surface of the window.

Tests conducted with KCl and NaCl windows coated according to the procedures outlined above have revealed that, when laser beams having wavelengths of 10.6 micrometers are passed through the coated windows, transmission is in excess of 99 percent. Windows having inner layers of $As_2Se_3$ 1.35 micrometers thick, layers of NaF 0.307 micrometers thick and outer layers of $As_2Se_3$ 0.390 thick appear to be within 1% of optimum and thickness are critical.

For near optimum transmission at wavelengths other than 10.6 micrometer wavelengths, the thicknesses of the three layers may be calculated from the following equation:

$$t_\lambda = \left(\frac{\lambda}{10.6}\right) t_{10.6\,\mu m}$$

where $t_\lambda$ is the thickness of the layer at the desired wavelength to be transmitted, is the desired wavelength of the light to be transmitted and $t_{10.6\,\mu m}$ is the thickness of the layer at 10.6 micrometers. For example, as is apparent from the foregoing, the thickness of the first $As_2Se_3$ layer at 10.6 micrometers is 1.35 μm. To find the desired thickness for this layer if it is desired to transmit light having a wavelength of 1.06 micrometers one simply substitutes into the equation as follows:

$$t_\lambda = \left(\frac{1.06}{10.6}\right)(1.35)$$

$$t_\lambda = .135 \text{ micrometers.}$$

The one repeats the process for the NaF and outer $As_2Se_3$ layers using the $t_{10.6\,\mu m}$ value of 0.307 disclosed above for the NaF layer and the $t_{10.6\,\mu m}$ value for the outer layer of $As_2Se_3$ of 0.390 which is also disclosed above.

If it is desired, the windows may be etched to remove contaminants prior to the first coating step. Concentrated HCl is a suitable etching material. This procedure is, however, not necessary.

What is claimed is:

1. An article of manufacture consisting essentially of:
   A. a base selected from the group consisting of NaCl and KCl;
   B. a layer of $As_2Se_3$ on said base;
   C. a layer of NaF on said layer of $As_2Se_3$; and
   D. a layer of $As_2Se_3$ on said layer of NaF.

2. An article of manufacture according to claim 1 wherein the layer of $As_2Se_3$ on said base has a thickness of about 1.35 micrometers, the layer of NaF has a thickness of about 0.307 micrometers and the layer of $As_2Se_3$ on said layer of NaF has a thickness of about 0.390 micrometers.

* * * * *